Figure 1:
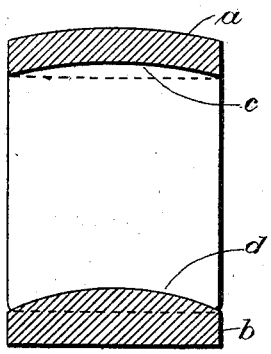

No. 705,134. Patented July 22, 1902.
F. B. POPE & G. D. MIMS.
METHOD OF FORMING ELASTIC AND YIELDABLE MATERIAL IN BALES OF CUBIC OR SQUARE SHAPE.
(Application filed Oct. 14, 1899.)

(No Model.) 3 Sheets—Sheet 1.

Witnesses
Frank A. Howell.

Inventors
Frederick B. Pope,
Giles D. Mims.
By
Attorney

No. 705,134. Patented July 22, 1902.
F. B. POPE & G. D. MIMS.
METHOD OF FORMING ELASTIC AND YIELDABLE MATERIAL IN BALES OF CUBIC OR SQUARE SHAPE.
(Application filed Oct. 14, 1899.)

(No Model.) 3 Sheets—Sheet 2.

WITNESSES:
Frank A. Howell
C. B. Bull

INVENTORS
Frederick B. Pope
Giles D. Mims
BY L. H. Dyer
ATTORNEY

No. 705,134. Patented July 22, 1902.
F. B. POPE & G. D. MIMS.
METHOD OF FORMING ELASTIC AND YIELDABLE MATERIAL IN BALES OF CUBIC OR SQUARE SHAPE.
(Application filed Oct. 14, 1899.)
(No Model.) 3 Sheets—Sheet 3.

WITNESSES:
Frank A. Howell
C. B. Bull

INVENTORS
Frederick B. Pope
Giles D. Mims
BY R. H. Dyer
ATTORNEY

UNITED STATES PATENT OFFICE.

FREDERICK B. POPE, OF AUGUSTA, GEORGIA, AND GILES D. MIMS, OF PARKSVILLE, SOUTH CAROLINA; SAID MIMS ASSIGNOR TO SAID POPE.

METHOD OF FORMING ELASTIC AND YIELDABLE MATERIAL IN BALES OF CUBIC OR SQUARE SHAPE.

SPECIFICATION forming part of Letters Patent No. 705,134, dated July 22, 1902.

Application filed October 14, 1899. Serial No. 733,589. (No model.)

*To all whom it may concern:*

Be it known that we, FREDERICK B. POPE, residing at Augusta, in the county of Richmond and State of Georgia, and GILES D. MIMS, residing at Parksville, in the county of Edgefield and State of South Carolina, citizens of the United States, have invented a certain new and useful Method of Forming Elastic and Yieldable Material in Bales of Rectangular Shape of High Density; and we do hereby declare the following to be a full, clear, and exact description of the invention, which will enable others skilled in the art to which it appertains to make and use the same.

Our invention has for its object the making of rectangular bales of elastic and yieldable material of high density.

Our invention relates to a method of forming a rectangular bale of great density by compressing a mass of flexible and yieldable material under great pressure in a curved form, having its top and bottom curved in the same direction. The resulting bale when removed from the embrace of the compressing means will assume a shape having flat sides and straight corners.

The invention relates more particularly to the baling of cotton; but the invention is not to be understood, however, as being exclusively limited to the baling of cotton or other fibers, as any form of flexible and yieldable material may be equally well employed, as hay, cloth, paper, or hides.

The invention, however, is limited to the method of forming rectangular bales of high density. By "high density" we mean that degree of compression which in the art to which the substance of the bale relates is considered as being high in contradistinction to being low. In the art of cotton-baling, for instance, any density over twenty-eight or thirty pounds to the cubic foot is considered as being high. Baling under high densities requires different methods and modes of procedure than baling under low densities.

By our method we compress the material under great pressure in a curved form, having its top and bottom curved in the same direction. The resulting bale is curved—that is, with a convex top and concave bottom and straight parallel sides and ends—until it is secured by ties and released from external pressure, when it immediately assumes a rectangular form.

If the top and bottom of the bale be formed flat instead of curved, the bale upon being hooped and released from external pressure will assume a shape other than rectangular.

We have observed that all bales that are initially formed rectangular under great pressure between flat surfaces always assume a form other than rectangular when released from external pressure.

We have found that by compressing the mass of material in curved form having the top and bottom curved in the same direction the bale will not have such a tendency to assume a form other than rectangular. Upon the bale being hooped and the external pressure transferred from two opposite sides to four sides, at least, of the six the bale will be confined at its periphery and the confining strain equally distributed thereover. The peripherally-constrained mass will tend to assume a form whereby the bulk will increase with a constant extent of periphery, the concave bottom will become flat, the convex top will assume the same shape, and the resulting bale will be rectangular.

All attempts to form a sufficiently rectangular bale of high density of elastic or yieldable material to satisfy all commercial requirements compressed by other methods than ours have failed. This we assume to be for the reason that the material has been preliminarily compressed in a square form, for the bales so made when bound and released from the embrace of the restraining surfaces, will inevitably assume a form other than rectangular. Furthermore, while being compressed under high pressure the same tendency to assume a form other than rectangular will assert itself and the pressure be irregularly distributed against the two restraining-surfaces, concentrating toward the centers thereof. The result is that that portion of the bale adjacent to the center of the pressing-surfaces will be subjected to greater pressure, injuring the material and subjecting the forming means to excessive strain.

One way to carry out our method is to introduce a quantity of material between two surfaces curved in the same direction and press it between them. After a dense bale is made having parallel sides, top, and bottom curved in the same direction it is hooped or wired and removed from the embrace of the two surfaces. It will then change its form and become rectangular.

Another way of carrying out our method is to first form the material in a bat or blanket, with the greater portion of the air excluded therefrom, if not already in this form. Then lap or fold it back and forth on a convexly-curved surface. The successive laps are held in position and subjected to great pressure by a corresponding concave surface, the pressure being applied as the laps are laid or afterward to the entire mass, or both while being laid and afterward. In order to permit of the lapping or folding of the bat, one of the surfaces may be provided with a slit or slot extending all the width thereof, and it may be arranged to oscillate across the face of the other surface. The bat or blanket is drawn through the slot and lapped or folded between the two curved surfaces, the latter separating as the mass of material accumulates. Upon a sufficient amount of material being introduced the bale is secured by ties or bands or by an envelop while under the pressure of the two opposing surfaces. The latter are then separated sufficiently, when the bale will immediately assume a rectangular form, the bottom dropping to a plane and the top conforming thereto. This will form a bale of greater bulk, and consequently of less density, than when it is embraced between the opposing surfaces, and its total surface will be greater, but its periphery, confined by the ties, will be no greater. In carrying out our method in this manner the following laps of compressed material being in contact with the concave resisting surface, which also oscillates, will press substantially equally thereon. There will be no resulting concentration of pressure to injure the material and cause unnecessary friction.

The above-described means are but two ways of carrying out our method to a practical conclusion, as others may suggest themselves to those skilled in the art.

In order to better understand the nature of our invention, attention is called to the accompanying drawings, showing means whereby our method may be carried out, and also showing the usual means, of which ours is an improvement.

Figure 2:
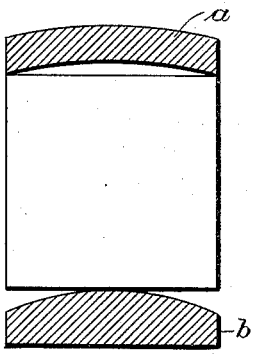
Figure 3:
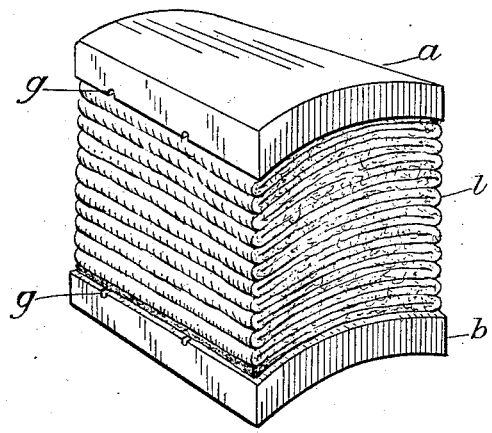
Figure 4:
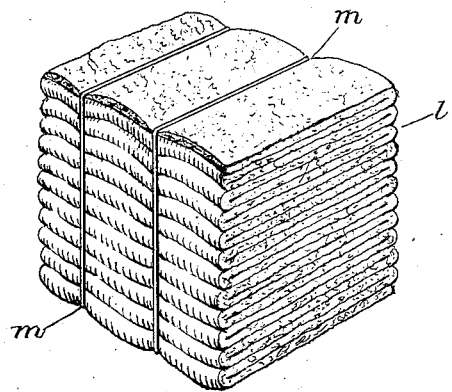

Figure 1 is a diagrammatical view showing the bale, highly compressed, embraced between two curved surfaces. Fig. 2 is a similar view of a bound bale, the curved surfaces being separated. Fig. 3 is a perspective view of a lapped bale embraced between two curved surfaces. Fig. 4 is a similar view of a bale hooped or tied and removed from the embrace of the curved surfaces; and Figs. 5, 6, 7, and 8 are diagrammatical views of a lapped bale embraced between two pressing-surfaces, showing how the bale is covered and hooped.

In all the views like parts are designated by identical letters of reference.

As shown in Fig. 1, the requisite mass of material is embraced and compressed between the upper and lower surfaces $a$ and $b$. The elastic mass being under great pressure, it will conform to the concave shape of the surface $a$ at $c$. At $d$ the bottom of the bale will become concave to conform to the surface $b$. The bale between the curved surfaces being tied or constrained at its periphery in the manner about to be described and the compressing-surfaces separated will assume the shape indicated in Fig. 2, the top dropping to a flat form and the bottom conforming thereto, making a perfect rectangle and a form of greater bulk with greater surface than the shape shown in Fig. 1.

The bale shown in Figs. 3 and 4 may be made by taking a blanket of cotton or a quantity of cloth $l$ and lapping it in curved form over the convex lower surface $b$ until the requisite amount is in position. Pressure may then be applied upon the surface $a$ until the requisite density is secured. (See Fig. 3.) Ties $m$ may be applied through the slots $g$, formed in both surfaces, and tightened in the usual manner, and upon the surfaces being separated the bale will become rectangular, as shown in Fig. 4.

Figure 5:
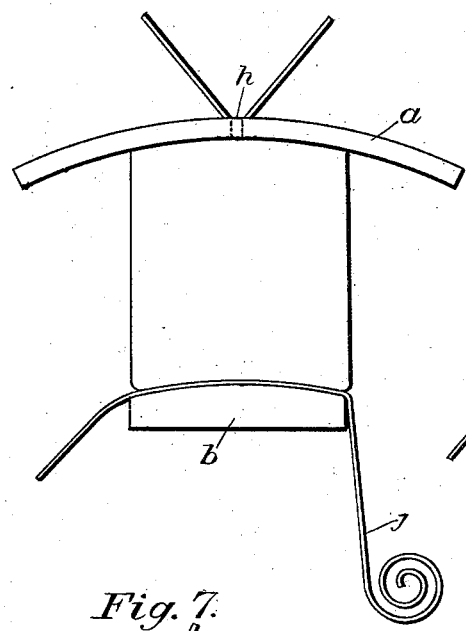
Figure 6:
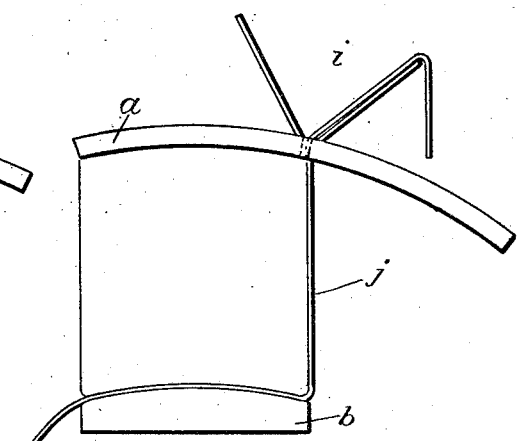
Figure 7:
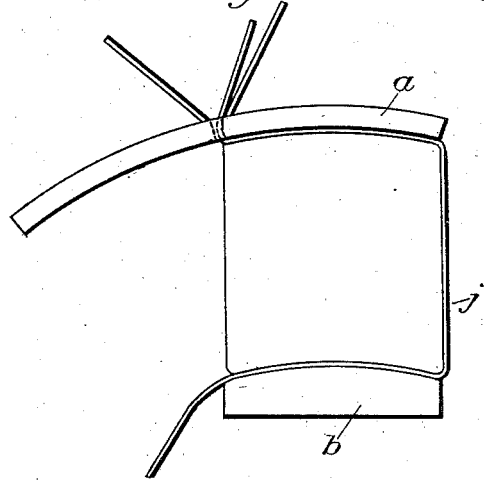
Figure 8:
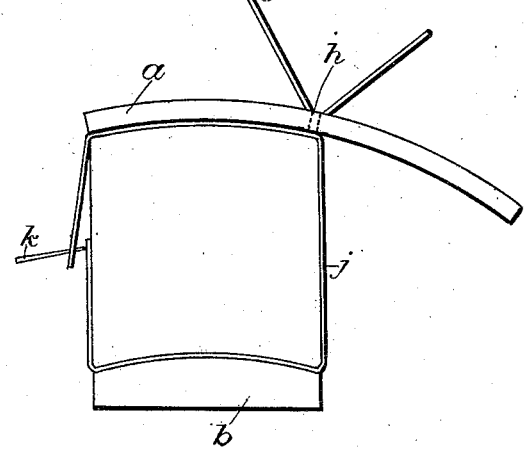

Another way of carrying out our process to form a lapped bale is to enlarge the concave upper surface $a$, as is shown in Figs. 5 to 8, and provide a slot $h$ in the center thereof, through which the bat may pass. The upper surface may be oscillated over the lower surface, drawing in and folding the laps back and forth in curved form over the surface $b$ until a sufficient amount of material has accumulated to form a bale. Pressure may be then applied to the surfaces, or their separation may be resisted during the folding operation, or the two compressing actions may be combined. Upon the bale reaching a sufficient size it may be wired or bound in any manner, one way being shown in Figs. 5 to 8, inclusive. These figures show means for binding a lapped bale. As is shown in Fig. 5, the suitable ties are placed upon the lower surface $b$ before the bat is laid. After the bale is completed the upper compressing-surface $a$ is moved to one side and one end of ties is introduced from underneath through the slot $h$ and deposited within the hopper $i$ and all slack removed from the portion $j$. The upper surface is then moved to the position shown in Fig. 7, which will cover the top of the bale with the ties. The end of the ties is returned through the slot and secured to the other end by means of any suitable tool, as that shown at $k$.

Any other means may be employed for carrying out our method, which consists, broadly, in baling elastic and yieldable material in rectangular bales of high density by compressing it under great pressure in a curved form having a top and bottom curved in the same direction.

Before claiming our invention we wish to define our meaning of the term "rectangular." By such term we do not wish to convey the meaning that a bale made by our process is mathematically rectangular, but that it sufficiently approaches the rectangular form to satisfy all commercial purposes and needs.

Having now particularly described and ascertained the nature of our invention, what we claim, and desire to secure by Letters Patent, is—

1. The method of compressing elastic and yieldable material in rectangular bales of high density, which consists in compressing the material under great pressure in a curved form having the top and bottom both curved in the same direction.

2. The method of compressing elastic and yieldable material in rectangular bales of high density, which consists in compressing the material under great pressure in a curved form having the top and bottom both curved in the same direction, and in tying or binding the bale while under pressure.

3. The method of compressing elastic and yieldable material in rectangular bales of high density, which consists in compressing the material in a bat or blanket, lapped under great pressure, in a curved form having the top and bottom both curved in the same direction.

4. The method of compressing elastic and yieldable material in rectangular bales of high density, which consists in compressing the material in a bat or blanket, lapped under great pressure, in a curved form having the top and bottom both curved in the same direction, and in tying or binding the bale while under pressure.

This specification signed and witnessed this 12th day of October, 1899.

FREDERICK B. POPE.
GILES D. MIMS.

Witnesses:
PORTER FLEMING,
L. S. DAVIS.